(12) United States Patent
Takayama et al.

(10) Patent No.: US 7,189,194 B1
(45) Date of Patent: Mar. 13, 2007

(54) MACHINE TOOL

(75) Inventors: Naoshi Takayama, Yamatokoriyama (JP); Michio Watanabe, Yamatokoriyama (JP); Satoshi Komatsu, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 11/530,905

(22) Filed: Sep. 12, 2006

(30) Foreign Application Priority Data

Sep. 13, 2005 (JP) .............................. 2005-264712

(51) Int. Cl.
*B23C 1/027* (2006.01)
*B23Q 3/157* (2006.01)

(52) U.S. Cl. ..................... 483/39; 409/191; 409/235; 408/234

(58) Field of Classification Search ................ 409/235, 409/191, 141, 238, 239, 202, 212, 190, 185; 408/234, 143; 483/30–31, 36, 39
See application file for complete search history.

(56) References Cited

U.S. PATENT DOCUMENTS 4,987,668 A * 1/1991 Roesch ........................ 483/30
6,161,995 A * 12/2000 Wakazono et al. .......... 409/235
6,843,624 B2 * 1/2005 Sugata et al. ................ 409/235
2003/0190206 A1 * 10/2003 Sugata et al. ................ 409/235

FOREIGN PATENT DOCUMENTS

| JP | 4-365529 A | * | 12/1992 |
| JP | 2000-24853 A | * | 1/2000 |
| JP | 2003-266257 A | * | 9/2003 |

* cited by examiner

*Primary Examiner*—Erica Cadugan
(74) *Attorney, Agent, or Firm*—Judge & Murakami IP

(57) ABSTRACT

Machine tool with: a bed furnished with a base and two side walls provided standing along respective left and right sides of the base; a first saddle composed of a rectangular frame, with vertical sides provided perpendicularly and transverse sides provided sideways, and both ends of the frame sideways being supported on rear faces of the side walls so as to be perpendicularly movable; a second saddle arranged within the first-saddle frame and provided to be movable sideways, and having a front-to-rear penetrating through-hole; a spindle head arranged in the second-saddle through-hole and provided to be movable back-and-forth; a tool-retaining spindle supported, by the spindle head, with its axis paralleling the front-to-rear orientation and rotatable about its axial center; and, arranged on the bed, a table on which workpieces are set.

2 Claims, 5 Drawing Sheets

PRIOR ART

PRIOR ART

MACHINE TOOL

BACKGROUND OF THE INVENTION

1. Technical Field

The present invention relates to machine tools furnished with: a bed; a table on which workpieces are carried and which is installed on the bed; a spindle for retaining a tool, and, with its axis disposed horizontally, provided to rotatable centered on the axis; and a feed mechanism for moving the table and the main spindle relatively to each other along three orthogonal axes.

2. Description of the Related Art

Such machine tools known to date include the example illustrated in FIG. 5 and FIG. 6 (cf. Japanese Unexamined Pat. App. Pub. No. 2003-266257).

This machine tool 100 comprises: a bed 101; a table 102 for carrying a workpiece W and installed on the upper surface of the bed 101 along the front, movable back and forth (along the Z-axis); a column 103 stood on the upper surface of the bed 101 along the rear; a saddle 104 supported on a front face of the column 103, movable perpendicularly (along the Y-axis); a spindle head 105 supported on a front face of the saddle 104, transverse movable sideways (along the X-axis); a main spindle 106 for retaining a tool (not illustrated), and by the spindle head 105 being supported to be rotatable about the spindle axis, which is parallel to the Z axis; a Z-axis guide mechanism 110 for guiding Z-axis directed movement of the table 102; a Y-axis guide mechanism 111 for guiding Y-axis directed movement of the saddle 104; an X-axis guide mechanism 112 for guiding X-axis directed movement of the spindle head 105; a Z-axis feed mechanism 113 for moving the table 102 along the Z-axis; a Y-axis feed mechanism 114 for moving the saddle 104 along the Y-axis; and an X-axis feed mechanism 115 for moving the spindle head 105 along the X-axis.

Thus, by the table 102, the saddle 104, and the spindle head 105 being driven by the respective feed mechanisms 113, 114, and 115 and guided by the guide mechanisms 110, 111, and 112 to travel along the Z-axis, along the Y-axis, and along the X-axis, respectively, the workpiece W on the table 102 and the (not-illustrated) tool on the main spindle 106 are moved relative to each other along the three orthogonal axes directions to machine the workpiece W.

However, a problem with the conventional machine tool 100 has been that with the saddle 104 being supported on the front face of the column 103 and the spindle head 105 being supported on the front face of the saddle 104, the saddle 104 and spindle head 105 jut out toward the front face of the machine tool 100, on account of which deflection or similar deformation occurs in the column 103, the saddle 104, and the spindle head 105, which is prohibitive of precision-machining the workpiece W precisely.

Furthermore, the Z-axis guide mechanism 110 and the Z-axis feed mechanism 113 are provided on the top face of the bed 101, the Y-axis guide mechanism 111 and the Y-axis feed mechanism 114 on the front face of the column 103, and the X-axis guide mechanism 112 and the X-axis feed mechanism 115 on the front face of the saddle 104. In other words, the Z-axis guide mechanism 110, the Z-axis feed mechanism 113, the Y-axis guide mechanism 111, the Y-axis feed mechanism 114, the X-axis guide mechanism 112, and the X-axis feed mechanism 115 are arranged facing the work area where the workpiece W is machined. Consequently, even though the Z-axis guide mechanism 110, the Z-axis feed mechanism 113, the Y-axis guide mechanism 111, the Y-axis feed mechanism 114, the X-axis guide mechanism 112, and the X-axis feed mechanism 115 are covered with suitable covers (not illustrated), chips generated during the machining of the workpiece W are likely to intrude into the covers such that maintenance on the covers has to be performed frequently, or expensive covers of complex structure have to be employed.

Furthermore, with the column 103 being situated along the rear portion of the bed 101, the Y-axis guide mechanism 111, the Y-axis feed mechanism 114, the X-axis guide mechanism 112, and the X-axis feed mechanism 115 are situated on the rear portion of the bed 101, a consequent problem has been that performing maintenance on the Y-axis guide mechanism 111, the Y-axis feed mechanism 114, the X-axis guide mechanism 112 and the X-axis feed mechanism 115 is difficult.

In addition, the machine tool 100 typically comprises a tool changer made up of a tool magazine for accommodating a plurality of tools, and an exchange mechanism, among other components. The exchange mechanism is provided at one end with an exchange arm having a grabber for grasping a tool housed in the tool magazine, and at the other end with a grabber for grasping the tool retained by the spindle 106, whereby the tool in the tool magazine and the tool retained by the spindle 106 can be exchanged by rotating the exchange arm about its rotational center axis paralleling the Z axis and meanwhile moving it along the Z-axis. However, if the installation footprint for the machine tool 100 is restricted widthwise (along the X-axis), the tool magazine and the exchange mechanism cannot be disposed on the lateral flanks of the bed 101, which leads to the tool magazine and exchange mechanism being disposed on the upper surface of the column 103. A problem with this situation has been that while the tool magazine and the exchange mechanism, jutting out toward the tip of the spindle 106, have to be supported by suitable support members, because the tip of the spindle 106 and the column 103 are separated in the Z-axis direction the support structure is destabilized.

BRIEF SUMMARY OF THE INVENTION

It is an object of the present invention, brought about taking the above-described circumstances into consideration, to provide a machine tool making it possible to perform precisionmachining, perform the maintenance easily, cut down on the cost of manufacturing, and support the tool changer stably.

In order to achieve the above object, the present invention provides a machine tool comprising: a bed including a base portion and two side walls standing on both sides of the base portion and opposed to each other with a distance therebetween; a first saddle formed of a rectangular frame member having vertical sides located in parallel with a perpendicular first axis and transverse sides located in parallel with a horizontal second axis, both end portions of which in the horizontal direction being supported on rear faces of the side walls of the bed so as to be movable in the direction of the first axis; a second saddle having an upper portion and a lower portion supported by the first saddle and located movable in the direction of the second axis; a spindle head located within the first saddle and supported by the second saddle such that the spindle head is movable in a direction of a third axis that is perpendicular to the first and second axis; a spindle for retaining a tool having an axis line in parallel with the third axis and supported by the spindle head rotatable around the axis line; a table located on the bed for placing a work thereon; a first guide mechanism for guiding the travel of the first saddle in the direction of the first axis; a second guide mechanism for guiding the travel of the second saddle in the direction of the second axis; a third guide mechanism for guiding the travel of the spindle head in the direction of the third axis; a first feed mechanism for moving the first saddle in the direction of the first axis; a second feed mechanism for moving the second saddle in the direction of the second axis; a third feed mechanism for moving the spindle head in the direction of the third axis; and a rotary drive mechanism for rotating the spindle around the axis line.

According to this invention, since the first saddle is formed of a rectangular frame member in which the spindle head is located, i.e., structures for supporting the saddle and the spindle head that protrude toward front face are omitted unlike the conventional machine tools, it is possible to prevent the bed, the first saddle, the second saddle, and the spindle head from being deformed (deflexed), thereby highly precisely processing works.

Furthermore, since the first saddle is supported by the rear faces of the side walls of the bed, it is possible to prevent the first guide mechanism and first feed mechanism from facing the work area where works are processed, and to separate the second guide mechanism, the second feed mechanism, the third guide mechanism and the third feed mechanism from the work area. Consequently, it is unlikely that chips would intrude into the first guide mechanism, the first feed mechanism, the second guide mechanism, the second feed mechanism, the third guide mechanism, and the third feed mechanism. As a result, it is possible to simplify the structures of the covers that prevent the chips from intruding into the chip, thereby cutting down on the cost of manufacturing and making it easy to maintain the cover.

Furthermore, since the first saddle is supported on the rear faces of the side walls of the bed, it is possible to maintain the first guide mechanism, the first feed mechanism, the second guide mechanism, the second feed mechanism, the third guide mechanism, and the third feed mechanism from the rear side of the machine tool, thereby making it easy to maintain the first guide mechanism, the first feed mechanism, the second guide mechanism, the second feed mechanism, the third guide mechanism, and the third feed mechanism.

Furthermore, since the spindle head has the rear portion to which various pipe arrangements and the wirings are connected, the pipe arrangements and the wirings oppose the movement of the spindle head so that the rear portion of the spindle head is swung and the axis line of the spindle is inclined when the spindle head is moved, thereby deteriorating the machining accuracy. However, according to the invention, since the first saddle is supported on the rear faces of the side walls of the bed, distances between the support portions (a portion of the side walls for supporting the first saddle, a portion of the first saddle for supporting the second saddle, and a portion of the second saddle for supporting the spindle head) and the connection portions of the spindle head with the pipe arrangements and the wirings can be shorter than those in a case that the first saddle is supported on the front faces of the side walls of the bed, so that the rear portion of the spindle head is unlikely to swing around the support portions as fulcrums when the spindle head is moved, i.e., the axis line of the spindle is unlikely to be inclined. This makes it possible to process works precisely, too.

The machine tool may further comprise a tool changer including a tool magazine accommodating a plurality of tools and an exchange mechanism for exchanging a tool accommodated in the tool magazine with a tool retained by the spindle. The bed may be formed with a support beam bridged across upper portions of the side walls. The tool magazine may be supported on an upper portion of the support beam, and the exchange mechanism may be supported on a lower portion of the support beam.

Accordingly, since the first saddle is supported on the rear faces of the side walls of the bed, the tip of the spindle and the front face of the support beam can be brought close to each other in a back and forth direction. As a result, the support beam can have structures that stably support the tool magazine and the exchange mechanism, because the tool magazine and the exchange mechanism are not supported protruding toward the tip of the spindle as in the conventional machine tool.

Furthermore, since the tool magazine is supported on the upper portion of the support beam and the exchange mechanism is supported on the lower portion of the support beam, it is possible to bring the exchange mechanism close to the spindle (to bring the operating region at the tool exchange operation by the exchange mechanism close to the spindle). As a result, it is possible to make preferable the support structures and the positioning relationship of the tool magazine and the exchange mechanism by making the structure of the exchange mechanism compact and shortening the operating time for the tool exchange, for example. In addition, the support beam can strengthen the stiffness of the bed, thereby performing a more precise process.

As described above, according to a machine tool of the present invention, since the spindle head is located within the frame of the first saddle, the bed, the first saddle, the second saddle, and the spindle head are unlikely to be deformed (deflexed), thereby performing a highly precise process. In addition, since the first saddle is supported on the rear faces of the side walls of the bed, the chips are unlikely to intrude into the first guide mechanism, the first feed mechanism, the second guide mechanism, the second feed mechanism, the third guide mechanism, and the third feed mechanism. As a result, it is possible to simplify the cover structures for preventing the chip intrusion, thereby cutting down on the cost of manufacturing and making it easy to maintain the cover. It is also possible to maintain the first guide mechanism, the first feed mechanism, the second guide mechanism, the second feed mechanism, the third guide mechanism, and the third feed mechanism from the rear side of the machine tool easily. Furthermore, distances between the support portions (a portion of the side walls for supporting the first saddle, a portion of the first saddle for supporting the second saddle, a portion of the second saddle for supporting the spindle head) and the connection portions of the spindle head with the pipe arrangements and the wirings are set shorter, thereby preventing the spindle head from being swung.

Furthermore, since the first saddle is supported on the rear faces of side walls of the bed, it is possible to bring the tip of the spindle close to the front face of the support beam in a back and forth direction. As a result, the tool magazine and the exchange mechanism can be stably supported by the support beam. Furthermore, since the tool magazine is supported on the upper portion of the support beam and the exchange mechanism is supported on the lower portion of the support beam and the distance between the exchange mechanism and the spindle becomes shorter, it is possible to make preferable the support structures and the positioning relationship of the tool magazine and the exchange mechanism by making the structure of the exchange mechanism compact and shortening the operating time for the tool exchange. Furthermore, since the support beam is bridged over the side walls of the bed, the stiffness of the bed is increased, thereby performing a more precise process.

From the following detailed description in conjunction with the accompanying drawings, the foregoing and other objects, features, aspects and advantages of the present invention will become readily apparent to those skilled in the art.

DETAILED DESCRIPTION OF THE INVENTION

A description will be made on an embodiment of the present invention with reference to the accompanying drawings.

Figure 1:
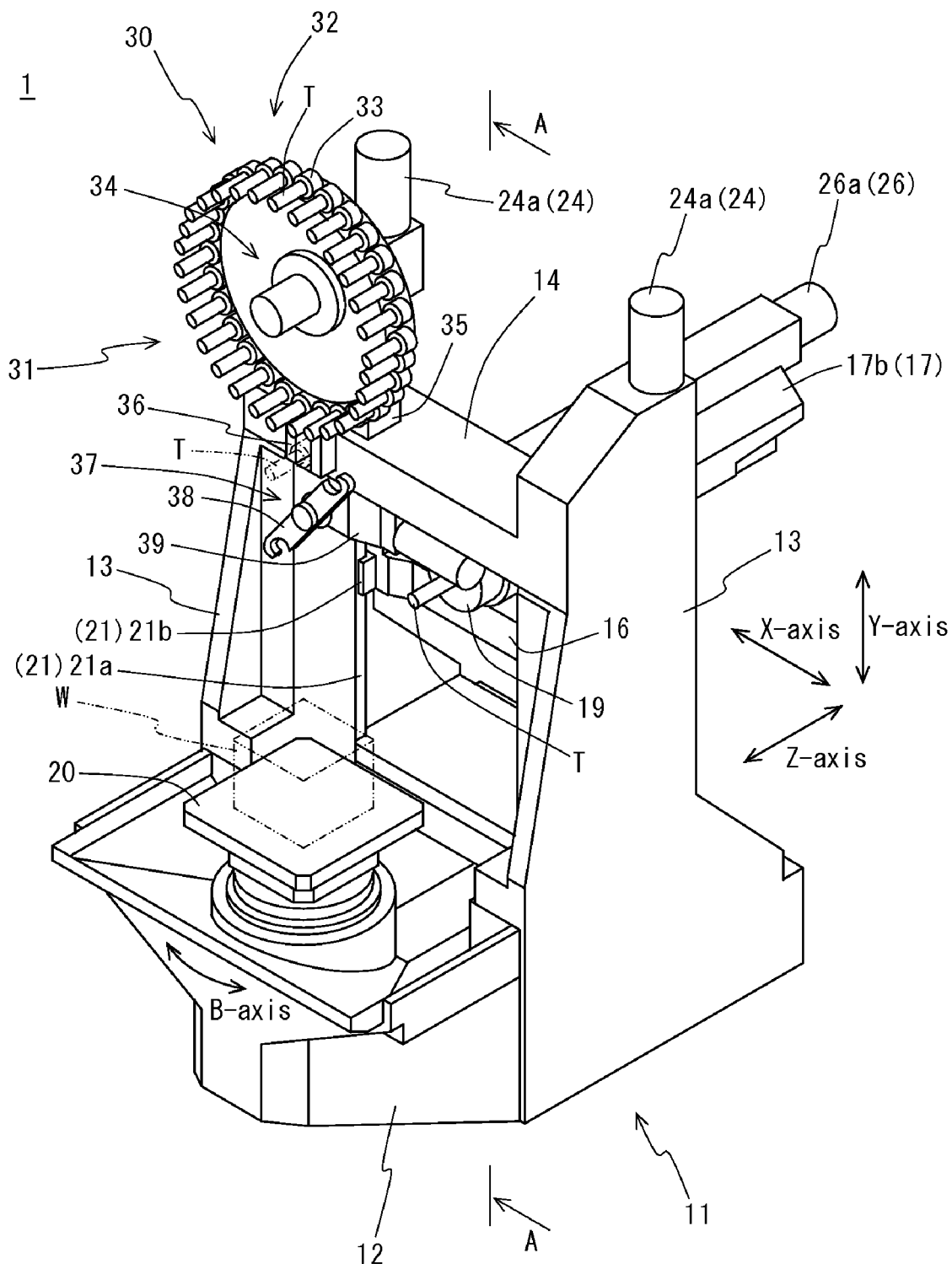
FIG. 1 is a perspective view of representing a schematic structure of the machine tool according to one embodiment of the present invention.
Figure 2:
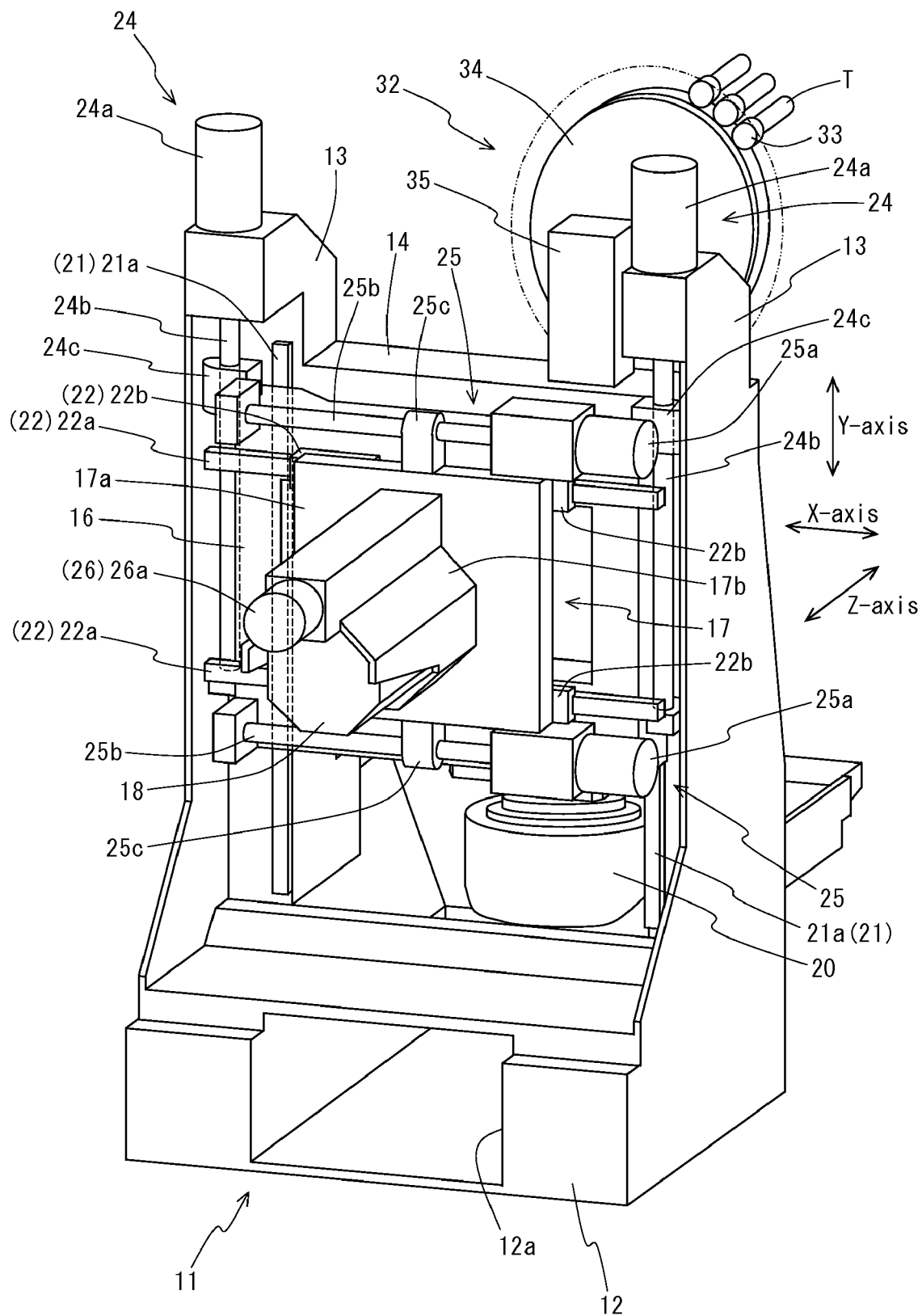
FIG. 2 is a perspective view of the machine tool of FIG. 1 seen from the rear side.
Figure 3:
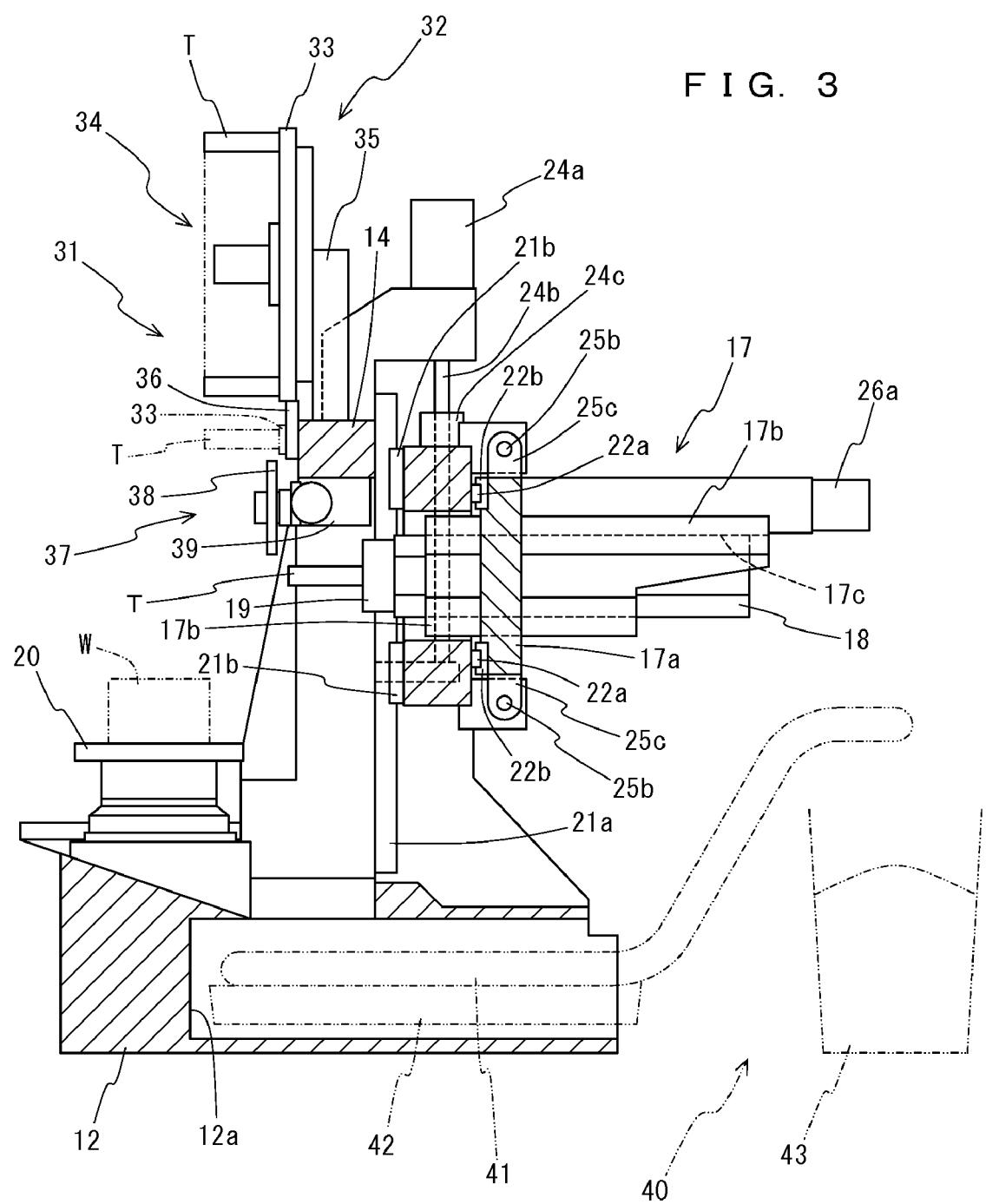
FIG. 3 is a cross-sectional view taken along A—A of FIG. 1.

As shown in FIG. 1 through FIG. 3, a machine tool 1 in this embodiment comprises a bed 11, a first saddle 16 placed on the bed 11 so as to be movable in a vertical direction (in the direction of the Y-axis), a second saddle 17 placed on the first saddle 16 so as to be movable in a transverse direction (the X-axis direction) in a horizontal plane, a spindle head 18 placed on the second saddle 17 so as to be movable in a back and forth direction (in the direction of the Z-axis) in a horizontal plane, a spindle 19 for retaining a tool T that is supported by the spindle head 18 so as to be rotatable around the axis line, a table 20 placed on the bed 11 so as to be rotatable around a rotational center line parallel with the Y axis, e.g., around a rotational center line perpendicular to the top face (around B axis), and a tool changer 30 for exchanging the tool T retained by the spindle 19 with a new tool T.

The machine tool 1 further comprises a Y-axis guide mechanism 21 to guide the travel of the first saddle 16 along the Y axis, an X-axis guide mechanism 22 to guide the travel of the second saddle 17 along the X axis, a Z-axis guide mechanism (not illustrated) to guide the travel of the spindle head 18 along the Z axis, a Y-axis feed mechanism 24 to move the first saddle 16 in the direction of the Y-axis, an X-axis feed mechanism 25 to move the second saddle 17 in the direction of the X-axis, a Z-axis Z-axis feed mechanism 26 to move the spindle head 18 in the direction of the Z-axis, a spindle rotary drive mechanism (not illustrated) to rotate the spindle 19 around its axis line, and a table rotary drive mechanism (not illustrated) to rotate the table 20 in the direction around the B axis to index it to a predetermined position in turning angle.

The bed 11 consists of a base portion 12, two side walls 13 that stand on both side of the base portion 12 in the direction of the X-axis and in the center in the direction of the Z-axis and are opposed to each other keeping a distance therebetween, a support beam 14 bridged between upper portions of the side walls 13. The base portion 12 is formed with a chip discharge hole 12a having one end opening on the top face in the center and the other end opening on the rear face, and the top surface of the base portion 12 is formed to be inclined toward the opening at one end of the chip discharge hole 12a.

In the chip discharge hole 12a is located a chip recovery device 40, which consists of a discharge mechanism 41 to transport chips generated during the process in a predetermined transfer direction and discharge them out of the machine, a reservoir 42 located upstream in the transport direction and below the discharge mechanism 41 to reserve the cutting fluid, and a recovery box 43 located at the end downstream in the transfer direction and below the discharge mechanism 41.

The discharge mechanism 41 is made up of a transport belt and so on, and transfers chips dropped onto the transport belt from the opening of the chip discharge hole 12a at one end downstream in the transfer direction (out of the machine). The reservoir 42 reserves the cutting fluid that is dropped with the chips from the opening of the chip discharge hole 12a at one end and flown from the discharge mechanism 41. The recovery box 43 collects the chips dropped off from the discharge mechanism 41 at the end downstream in the transfer direction of the discharge mechanism 41.

The first saddle 16 is rectangular and has a shape of frame in which transverse sides are placed in parallel with the X axis and vertical sides are placed in parallel with the Y axis. The first saddle 16 has front faces of the end portions (front faces of the vertical sides) in the direction of the X-axis that are supported on rear faces of the side walls 13 of the bed 11, and is movable in the direction of the Y-axis.

The second saddle 17 consists of a flat support portion 17a, and a tubular container 17b located on and protruding from both faces in the center (the front face and the rear face) of the support portion 17a and having a through hole 17c penetrating therethrough in the direction of the Z-axis. The front face of the upper portion and the front face of the lower portion of the support portion 17a are supported by rear faces on the transverse sides of the first saddle 16, and movable in the direction of the X-axis, while the container 17b being located within the first saddle 16.

The spindle head 18 is supported in the through hole 17c of the container 17b of the second saddle 17 so as to be movable in the direction of the Z-axis. The spindle 19 is located such that its axis line is in parallel with the Z axis, and is supported on the front end of the spindle head 18 so as to be rotatable so that it is movable in the directions of the X-axis, the Y-axis, and the Z-axis (the orthogonal three axis directions) within a region surrounded by the base portion 12 of the bed 11, the side walls 13, and the support beam 14.

Between the rear faces of the side walls 13 and the table 20 in the direction of the Z-axis within the region surrounded by the base portion 12, the side walls 13, and the support beam 14, a cover (not illustrated) is provided to partition the work area where the workpiece W is processed. The cover prevents the chips and the cutting fluid from intruding into the rear portion side (the first saddle 16, the second saddle 17, the spindle head 18, the Y-axis guide mechanism 21, the X-axis guide mechanism 22, the Z-axis guide mechanism (not illustrated), the Y-axis feed mechanism 24, the X-axis feed mechanism 25, and the Z-axis Z-axis feed mechanism 26). The front end of the spindle 19 protrudes beyond the front face of the cover (not illustrated).

The table 20 is located on a top face near the front face of the base portion 12 of the bed 11 and in the center in the direction of the X-axis, and has a top face on which the workpiece W is placed.

The Y-axis guide mechanism 21 consists of guide rails 21a located on the rear faces of the side walls 13 of the bed 11 along the Y axis, and sliders 21b fixed to the front faces of the vertical sides of the first saddle 16 and engaged with the guide rails 21a movably.

The Y-axis feed mechanism 24 consists of drive motors 24a that are located on top faces of the side walls 13 of the bed 11, ball screws 24b that are located on the rear faces of the side walls 13 of the bed 11 along the Y axis to be driven by the drive motors 24a around the axis centers, and nuts 24c that are fixed to the first saddle 16 and screwed with the ball screws 24b.

In the Y-axis guide mechanism 21 and the Y-axis feed mechanism 24, when the drive motors 24a are driven to rotate the ball screws 24b around the axis centers, the nuts 24c move along the ball screws 24b. Consequently, the first saddle 16 is guided by the guide rails 21a and the sliders 21b in the direction of the Y-axis.

The X-axis guide mechanism 22 consists of guide rails 22a located on rear face of the first saddle 16 on a transverse side along the X axis, and sliders 22b fixed to a front face of an upper portion and a front face of a lower portion of the support portion 17a of the second saddle 17 and engaged with the guide rails 22a movably.

The X-axis feed mechanism 25 consists of drive motors 25a that are located on traversal sides of the first saddle 16, ball screws 25b that are located on transverse sides of the first saddle 16 along the X axis and rotated by the drive motors 25a around the axis centers, and nuts 25c that are fixed to the second saddle 17 and engaged with the ball screws 25b.

In the X-axis guide mechanism 22 and the X-axis feed mechanism 25, when the drive motors 25a are driven to rotate the ball screws 25b around the axis centers, the nuts 25c are moved along the ball screws 25b. Consequently, the second saddle 17 is guided by the guide rails 22a and the sliders 22b in the direction of the X-axis.

The Z-axis guide mechanism (not illustrated) consists a guide rail (not illustrated) is located on the inner circumferential surface of the through hole 17c of the second saddle 17 along the Z axis, and a slider (not illustrated) fixed to the outer circumferential surface of the spindle head 18 and engaged with the guide rail (not illustrated) movably.

The Z-axis feed mechanism 26 consists of a drive motor 26a located on a rear face of the container 17b of the second saddle 17, a ball screw (not illustrated) located on the second saddle 17 along the Z axis and rotated by the drive motor 26a around the axis center, and a nut (not illustrated) fixed to the outer circumferential surface of the spindle head 18 and screwed with the ball screw (not illustrated).

In the Z-axis guide mechanism (not illustrated) and the Z-axis feed mechanism 26, when the drive motor 26a is driven to rotate the ball screw (not illustrated) around the axis center, the nut (not illustrated) is moved along the ball screw. Consequently, the spindle head 18 is guided by the guide rail (not illustrated) and the slider (not illustrated) in the direction of the Z-axis.

The tool changer 30 comprises a tool magazine 31 consisting of a magazine main body 32 supported on the top face of the support beam 14 of the bed 11 to accommodate a plurality of tools T therein and a transfer mechanism 36 located on the front face of the support beam 14 to transfer the tool T stored in the magazine main body 32 to the predetermined exchange position and position it there, and an exchange mechanism 37 supported on the top face of the support beam 14 to exchange the tool T retained by the spindle 19 with the tool transferred to the exchange position and positioned there by the transfer mechanism 36.

The magazine main body 32 consists of a plurality of retaining members 33 for retaining the tools T, a move mechanism 34 that supports the retaining members 33 to rotate the retaining members 33 that retains the tool T as a thing to be exchanged around a rotational center axis in parallel with the Z axis to the predetermined transfer position, and a support member 35 fixed to the top face of the support beam 14 to support the move mechanism 34.

The transfer mechanism 36 transfers the retaining member 33 (tool T), which has been moved to the transfer position by the move mechanism 34 of the magazine main body 32, downward to position it in the exchange position.

The exchange mechanism 37 consists of an exchange arm 38 located in parallel with the XY-plane and having a gripper gripping the tool T retained by the spindle 19 at one end and a gripper gripping the tool T transferred and positioned at the exchange position by the transfer mechanism 36 at the other end, and a drive mechanism 39 that supports the exchange arm 38. The drive mechanism 39 rotates the exchange arm around the rotational center axis in parallel with the Z axis and moves it linearly in the direction of the Z-axis. The drive mechanism 39 is located on the under face of the support beam 14.

In the tool changer 30, first, the retaining member 33 retaining the tool T as a thing to be exchanged is moved by the move mechanism 34 of the magazine main body 32 to the predetermined transfer position, and then is transferred by the transfer mechanism 36 to the exchange position and positioned there. After that, the drive mechanism 38 of the exchange mechanism 39 performs the rotational movement operation and the linear movement operation of the exchange arm 38 to exchange the tool T in the retaining member 33, which has been moved to the exchange position and positioned there, with the tool T on the spindle 19.

According to the machine tool 1 of the embodiment configured as described, the Y-axis feed mechanism 24 moves the first saddle 16 under guide of the Y-axis guide mechanism 21 in the direction of the Y-axis, the X-axis feed mechanism 25 moves the second saddle 17 under guide of the X-axis guide mechanism 22 in the direction of the X-axis, the Z-axis feed mechanism 26 moves the spindle head 18 under guide of the Z-axis guide mechanism (not illustrated) in the direction of the Z-axis, and the spindle rotary drive mechanism (not illustrated) rotates the spindle 19 around the center axis line. As a result, the workpiece W on the table 20 is processed by the tool T retained by the spindle 19.

The chips generated in the cutting process and the cutting fluid supplied into the contact portion between the tool T and the workpiece W are dropped off from the chip discharge hole 12a of the base portion 12 onto the discharge mechanism 41. The chips are transferred by the discharge mechanism 41 and collected into the recovery box 43. The cutting fluid is flown downward from the discharge mechanism 41 and is collected into the reservoir 42.

During the process, the table 20 (the workpiece W on the table 20) is indexed by the table rotary drive mechanism (not illustrated) to the predetermined position in turning angle in the direction around the B axis. The tool T retained by the spindle 19 can be exchanged by the tool changer 30 with various tools T stored in the tool magazine 31 as necessary.

As described above, in the machine tool 1 of the embodiment, since the first saddle 16 is rectangular and has a shape of frame in which the second saddle 17 is located, and the second saddle 17 is formed with the through hole 17c into which the spindle head 18 is located, omitting structures for supporting the saddle 104 and the spindle head 105 protruding toward the front face in the conventional machine tool 100, it is possible to prevent the bed 11, the first saddle 16, the second saddle 17, and the spindle head 18 from being deformed (deflexed, for example), thereby highly precisely processing the workpiece W.

Furthermore, since the first saddle 16 are supported on the rear faces of the side walls 13, it is possible to prevent the Y-axis guide mechanism 21 and the Y-axis feed mechanism 24 from facing the work area. It is also possible to separate the X-axis guide mechanism 22, the X-axis feed mechanism 25, the Z-axis guide mechanism (not illustrated), and the Z-axis feed mechanism 26 from the work area. Consequently, it is unlikely that the chips intrude into the Y-axis guide mechanism 21, the Y-axis feed mechanism 24, the X-axis guide mechanism 22, the X-axis feed mechanism 25, the Z-axis guide mechanism (not illustrated), and the Z-axis feed mechanism 26. As a result, it is possible to simplify a structure of the cover (not illustrated), thereby cutting down on costs of manufacturing and making it easy to maintain the cover (not illustrated).

Furthermore, since the first saddle 16 is supported on the rear faces of the side walls 13, it is possible to carry out maintenance of the Y-axis guide mechanism 21, the Y-axis feed mechanism 24, the X-axis guide mechanism 22, the X-axis feed mechanism 25, the Z-axis guide mechanism (not illustrated), and the Z-axis feed mechanism 26 from the rear side of the machine tool 1. In other words, it is possible to make it easy to maintain the Y-axis guide mechanism 21, the Y-axis feed mechanism 24, the X-axis guide mechanism 22, the X-axis feed mechanism 25, the Z-axis guide mechanism (not illustrated), and the Z-axis feed mechanism 26.

Since various pipe arrangements and wirings are connected with the rear portion of the spindle head 18, when the spindle head 18 is moved, the pipe arrangements and wirings oppose the movement so that the rear portion of the spindle head 18 is swung and the axis line of the spindle 19 is inclined, thereby deteriorating the machining accuracy. However, since the first saddle 16 is supported on the rear faces of the side walls 13, distances between the support portions (a portion of the side walls 13 for supporting the first saddle 16, a portion of the first saddle 16 for supporting the second saddle 17, and a portion of the second saddle 17 for supporting the spindle head 18) and the connection portions of the spindle head 18 with the pipe arrangements and the wirings can be shorter than those in the case that the first saddle 16 is supported on the front faces of the side walls 13. Consequently, when the spindle head 18 is moved, the rear portion side of the spindle head 18 is unlikely to swing around the support portions as fulcrums, i.e., the axis line of the spindle 19 is unlikely to be inclined. As a result, this makes it possible to precisely process the work, too.

Furthermore, since the first saddle 16 is supported on the rear faces of the side walls 13, the tip of the spindle 19 and the front face of the support beam 14 can be located close to each other in the direction of the Z-axis. Consequently, the tool magazine and the exchange mechanism are not supported protruding toward the tip of the spindle 106, unlike the conventional machine tool 100. As a result, it is possible to stabilize the structure of the support beam 14 for supporting the magazine main body 32, the transfer mechanism 36, and the exchange mechanism 37.

Furthermore, since the magazine main body 32 is placed on the top face of the support beam 14, the transfer mechanism 36 is placed on the front face of the support beam 14, and the exchange mechanism 37 is placed on the under face of the support beam 14, it is possible to bring the exchange mechanism 37 close to the spindle 19 (to bring the operating range of the exchange arm 38 at the tool exchange operation close to the spindle 19), it is possible make preferable the support structures and the positioning relationships of the magazine main body 32, the transfer mechanism 36, and the exchange mechanism 37, e.g., making the exchange arm 38 compact or shortening the operating time for the tool exchange. It is also possible to perform a more highly precise process because the support beam 14 improves the stiffness of the bed 11.

Although the one embodiment of the present invention is described above, specific embodiments that can be employed by the present invention are not limited to this embodiment.

For example, the structures of the tool magazine 31 (the magazine main body 32 and the transfer mechanism 36) and the exchange mechanism 37 of the tool changer 30 are not limited those described above, and various structures can be employed.

The base portion 12, the side walls 13 and the support beam 14 of the bed 11 may be formed integrally or may be formed of separate members.

The structure of the Z-axis guide mechanism (not illustrated) is not specifically limited as in the above embodiment. In one example, a guide rail (not illustrated) may provided on inner circumferential surface of the lower portion of the through hole 17c, and a slider (not illustrated) may be provided on the outer circumferential surface of the lower portion of the spindle head 18. In another example, a guide rail (not illustrated) may be provided on the inner circumferential surface of the upper portion of the through hole 17c, and a slider (not illustrated) may be provided on the outer circumferential surface of the upper portion of the spindle head 18. In a further other example, guide rails (not illustrated) may be provided on the inner circumferential surface of the upper portion and the inner circumferential surface of the lower portion of the through hole 17c, and sliders (not illustrated) may be provided on outer circumferential surface of the upper portion and the outer circumferential surface of the lower portion of the spindle head 18. In a further other example, guide rails (not illustrated) are provided on left and right sides of the inner circumferential surfaces of the through hole 17c, sliders (not illustrated) may be provided on the left and right sides of the outer circumferential surface of the spindle head 18. In a further other example, a guide rail (not illustrated) may be provided on the outer circumferential surface of the spindle head 18, and a slider (not illustrated) may be provided on the inner circumferential surface of the through hole 17c, as in the cases described above.

Figure 4:
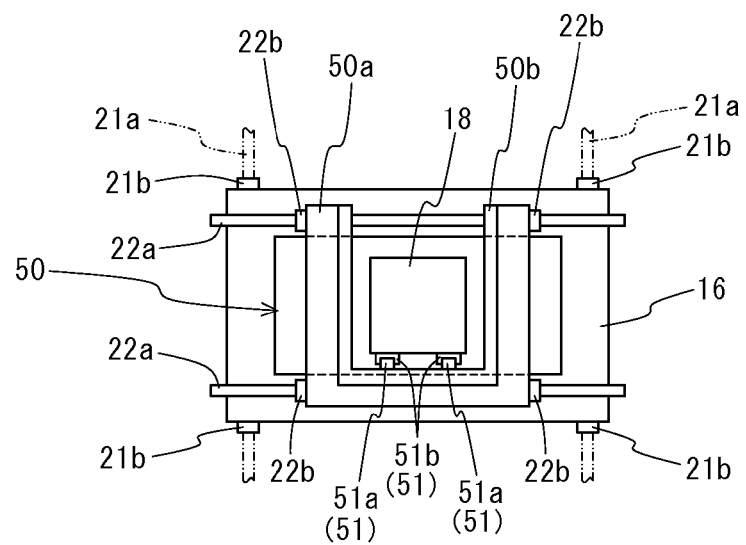
FIG. 4 is a rear view of representing schematic structures of the first saddle, the second saddle, and the spindle head according to another embodiment of the present invention.
Figure 5:
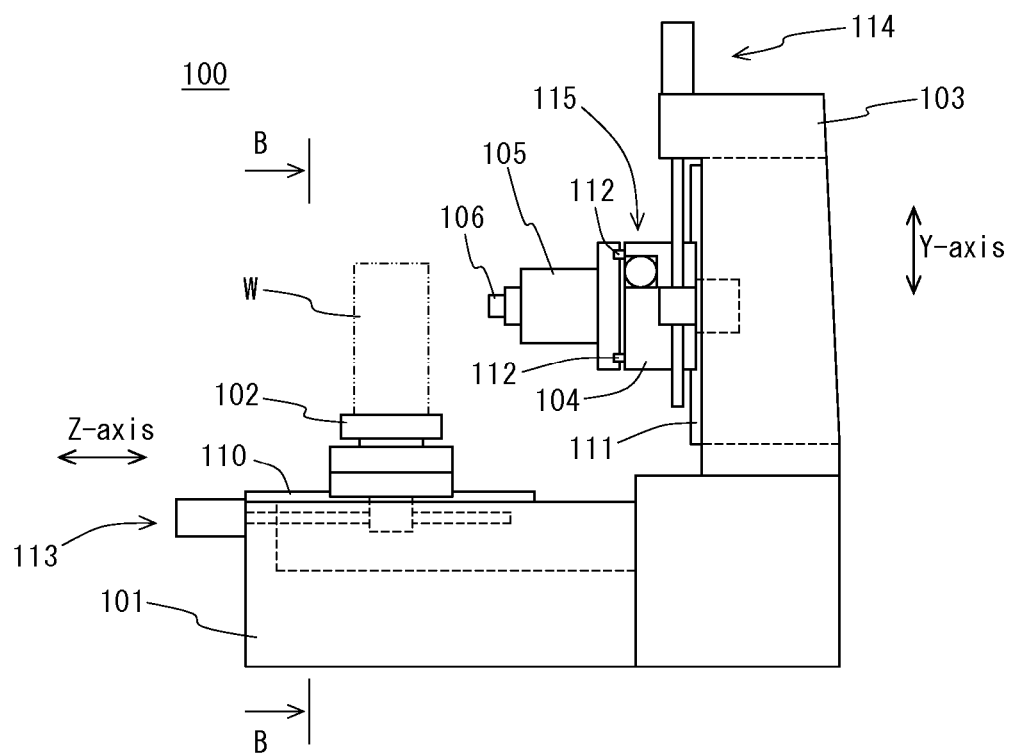
FIG. 5 is a side view of representing a schematic structure of a machine tool according to a conventional example.
Figure 6:
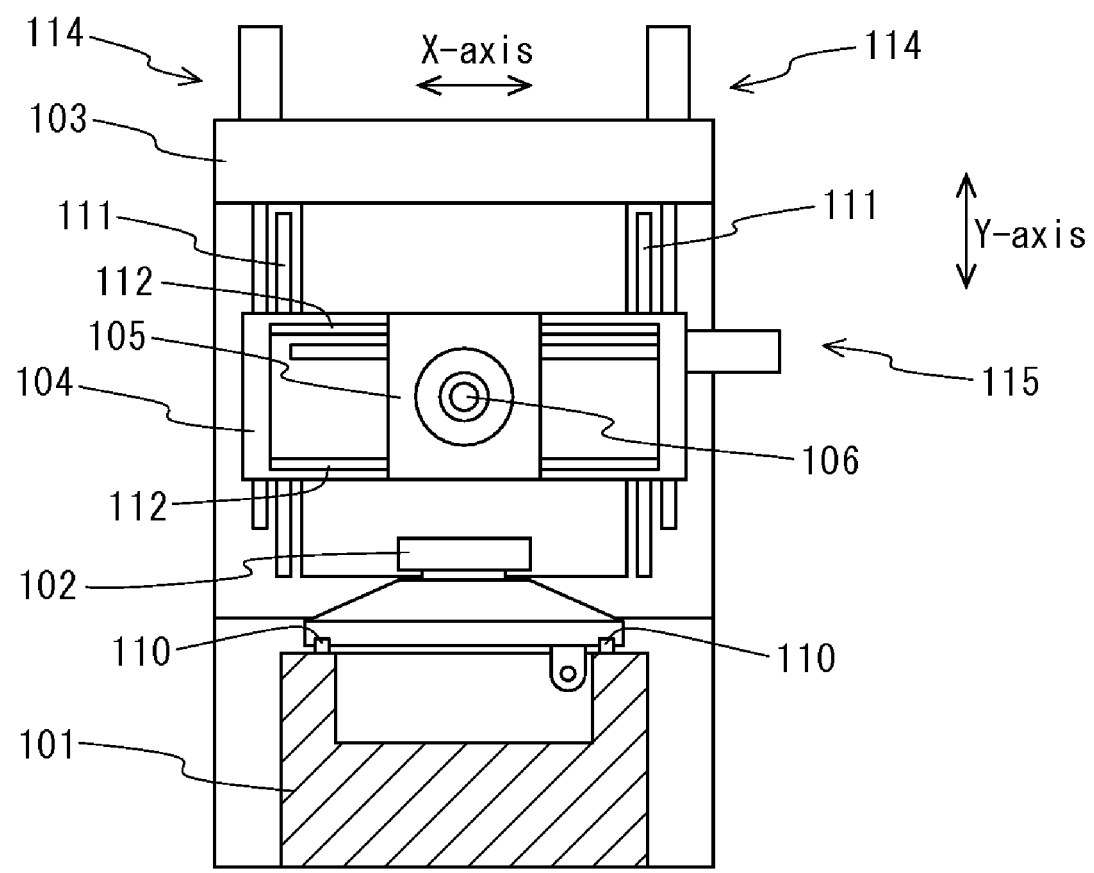
FIG. 6 is a cross-sectional view taken along B—B of FIG. 5.

Furthermore, although the second saddle 17 is formed with the container 17b and the through hole 17c, in which the spindle head 18 is placed in the above example, the present invention is not limited to this example. For example, as shown in FIG. 4, a second saddle 50 may be formed of a U-shaped support portion 50a and a container 50b having an opening upper portion, which supports the spindle head 18. It should be noted that the Y-axis feed mechanism 24, the X-axis feed mechanism 25 and the Z-axis feed mechanism 26 are omitted in FIG. 4.

In this case, the support portion 50a is formed flat, and the container 50b is formed such that it protrudes from the front face and rear face of the support portion 50a in the direction of the Z-axis, and the spindle head 18 is supported by the container 50b so as to be positioned within the frame of the first saddle 16. In addition, the Z-axis guide mechanism 51 that guides the travel of the spindle head 18 in the direction of the Z-axis consists of guide rails 51a that are located on the top face of the bottom portion of the container 50b of the second saddle 50 along the Z axis and sliders 51b that are fixed to the outer circumferential under face of the spindle head 18 and engaged with the guide rails 51a movably. It should be noted that the guide rails 51a may be provided on inner circumferential surfaces of the side walls of the container 50b, and the sliders 51b may be provided on left and right sides of the outer circumferential surface of the spindle head 18. Alternatively, the guide rails 51a may be provided on the spindle head 18, and the sliders 51b may be provided on the container 50b.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A machine tool comprising:
   a bed including a base portion, and two side walls provided standing along respective sides of the base portion and opposing each other across an interval;
   a first saddle formed of a rectangular frame member having vertical sides paralleling a perpendicular first axis and transverse sides paralleling a horizontal second axis, both horizontal end portions of said first saddle being supported on rear faces of the side walls of the bed so as to be movable along the first axis;
   a second saddle having an upper portion and a lower portion each supported by the first saddle and provided to be movable along the second axis;
   a spindle head disposed within the first saddle and supported by the second saddle to be movable along a third axis perpendicular to the first axis and the second axis;
   a spindle for retaining a tool at the front thereof, the spindle axis paralleling the third axis and the spindle being supported by the spindle head to be rotatable about the spindle axis;
   a table for carrying workpieces, the table disposed on the bed;
   a first guide mechanism for guiding the travel of the first saddle along the first axis;
   a second guide mechanism for guiding the travel of the second saddle along the second axis;
   a third guide mechanism for guiding the travel of the spindle head along the third axis;
   a first feed mechanism for moving the first saddle along the first axis;
   a second feed mechanism for moving the second saddle along the second axis;
   a third feed mechanism for moving the spindle head along the third axis; and
   a rotary drive mechanism for rotating the spindle about the spindle axis.

2. A machine tool set forth in claim 1, further comprising a tool changer including a tool magazine for housing a plurality of tools, and an exchange mechanism for exchanging a tool housed in the tool magazine with a tool retained by the spindle, wherein:
   the bed is formed with a support beam bridging upper portions of the side walls; and
   the tool magazine is supported on an upper portion of the support beam, and the exchange mechanism is supported on a lower portion of the support beam.

* * * * *